(12) United States Patent
Wright

(10) Patent No.: US 6,938,365 B2
(45) Date of Patent: Sep. 6, 2005

(54) DAMPENING APPARATUS

(76) Inventor: Stewart James Wright, 25 Christensen Road, Stapylton, Queensland 4207 (AU)

( * ) Notice: Subject to any disclaimer, the term of this patent is extended or adjusted under 35 U.S.C. 154(b) by 0 days.

(21) Appl. No.: 10/381,210

(22) PCT Filed: Mar. 14, 2002

(86) PCT No.: PCT/AU02/00295
§ 371 (c)(1),
(2), (4) Date: Mar. 28, 2003

(87) PCT Pub. No.: WO02/072964

PCT Pub. Date: Sep. 19, 2002

(65) Prior Publication Data

US 2003/0183400 A1 Oct. 2, 2003

(30) Foreign Application Priority Data

Mar. 14, 2001 (AU) .............................................. PR3715

(51) Int. Cl.⁷ .......................... F16F 15/023; E02F 3/96
(52) U.S. Cl. ........................ 37/403; 172/817; 172/605; 188/316
(58) Field of Search ................................ 172/605, 817; 188/151 R, 378, 316; 267/64.11; 303/DIG. 1, DIG. 2; 37/445, 444, 465, 403

(56) References Cited

U.S. PATENT DOCUMENTS

| 3,321,031 | A | | 5/1967 | Evans |
| 3,999,745 | A | * | 12/1976 | Mahoff ..................... 267/64.11 |
| 4,060,043 | A | | 11/1977 | Löfgren |
| 4,191,280 | A | * | 3/1980 | Copperwheat .............. 188/300 |
| 4,273,056 | A | | 6/1981 | Löfgren et al. |
| 4,280,600 | A | * | 7/1981 | Salmon et al. .............. 188/312 |
| 4,288,196 | A | | 9/1981 | Sutton, II |
| 4,342,270 | A | | 8/1982 | Löfgren et al. |
| 4,662,486 | A | * | 5/1987 | Stenberg ..................... 188/312 |
| 4,735,158 | A | | 4/1988 | Paul et al. |
| 4,940,096 | A | * | 7/1990 | Johnson ..................... 172/443 |
| 5,064,339 | A | * | 11/1991 | Ahlers ......................... 414/687 |
| 5,482,121 | A | * | 1/1996 | Draney et al. ................ 172/40 |
| 5,507,354 | A | | 4/1996 | Harleman |
| 5,511,329 | A | * | 4/1996 | Mickelson ................... 37/468 |
| 5,558,190 | A | * | 9/1996 | Chang ......................... 188/312 |
| 5,823,306 | A | * | 10/1998 | de Molina ............. 188/322.15 |
| 5,911,290 | A | * | 6/1999 | Steed ........................ 188/282.4 |
| 6,056,067 | A | * | 5/2000 | Brown ........................ 172/111 |
| 6,219,946 | B1 | * | 4/2001 | Soczka ......................... 37/445 |
| 6,609,315 | B1 | * | 8/2003 | Hendron et al. .............. 37/348 |
| 6,684,537 | B2 | * | 2/2004 | Ichikawa et al. ............. 37/347 |
| 6,757,994 | B1 | * | 7/2004 | Hendron ....................... 37/348 |

FOREIGN PATENT DOCUMENTS

FR 75 18728 6/1975
WO 00/53522 9/2000

* cited by examiner

Primary Examiner—Robert E. Pezzuto
Assistant Examiner—Alexandra Pechhold
(74) Attorney, Agent, or Firm—Hoffman, Wasson & Gitler

(57) ABSTRACT

A dampening means for a tool, the dampening means controlling pivoting of the tool with respect to a support means of a support structure.

7 Claims, 3 Drawing Sheets

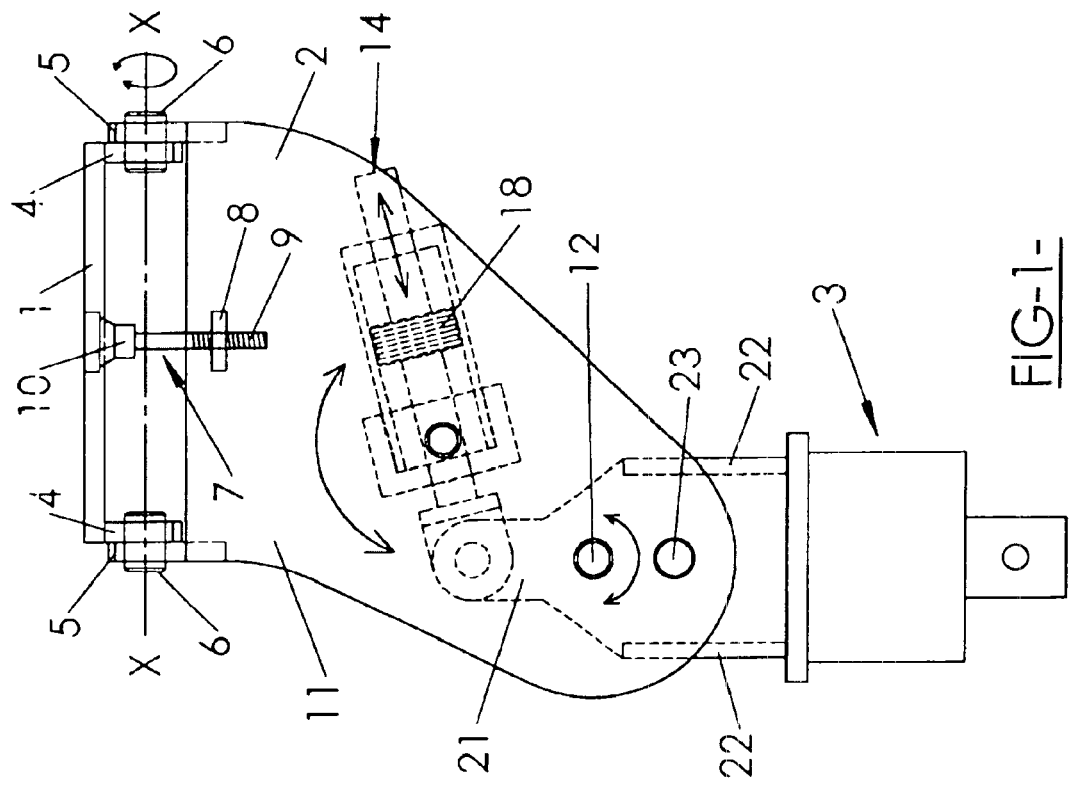
FIG-1-
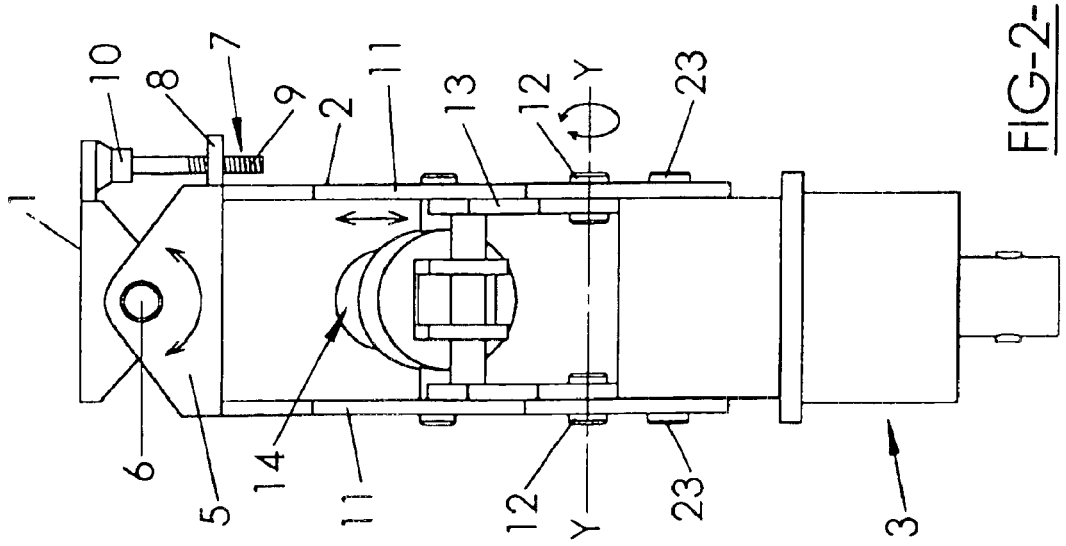
FIG-2-

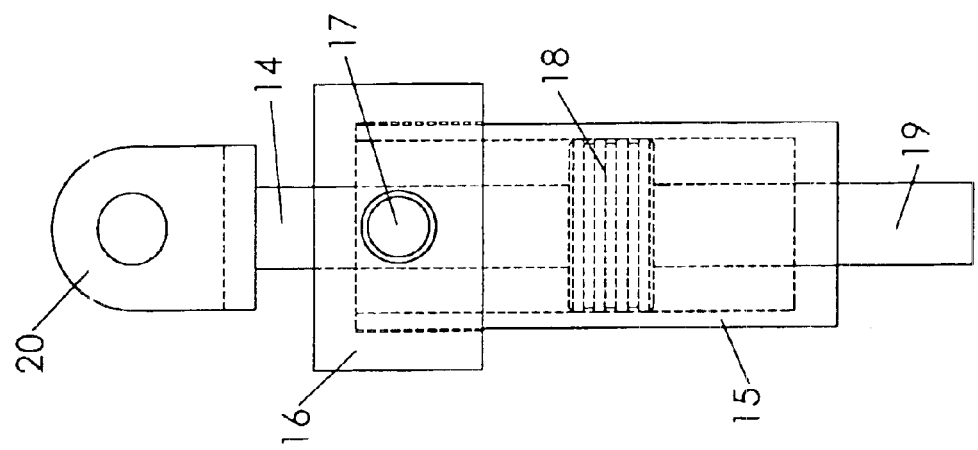
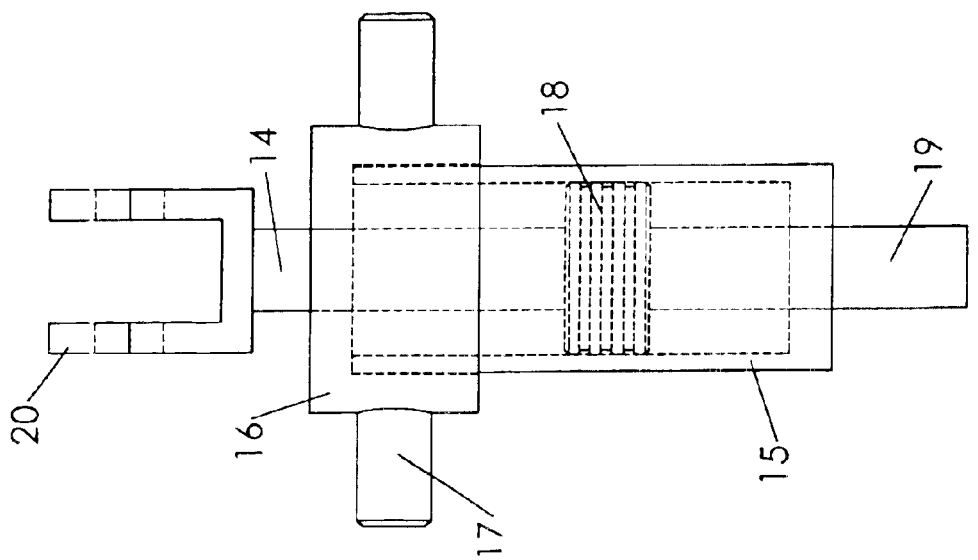

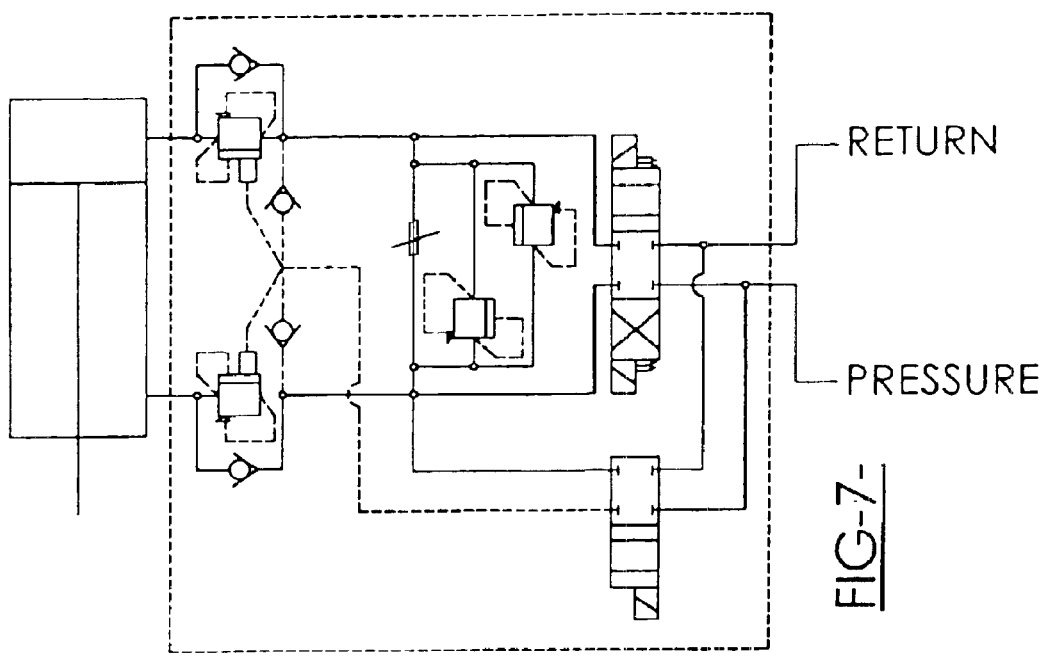
FIG-7-
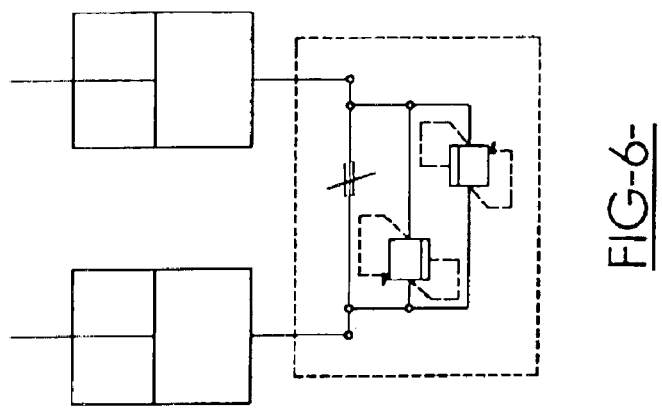
FIG-6-
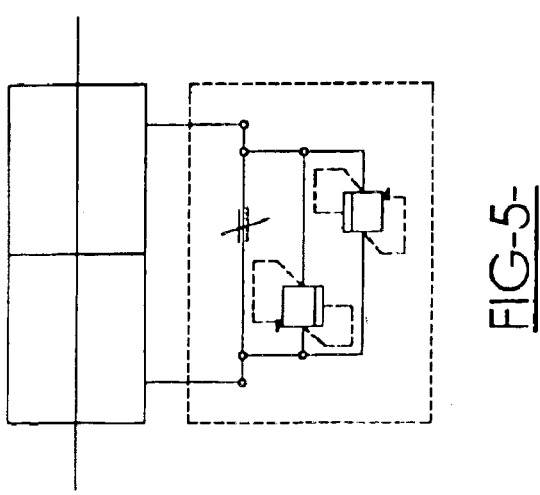
FIG-5-

ND# DAMPENING APPARATUS

TECHNICAL FIELD

This invention relates to dampening apparatus and has particular relevance to apparatus used for dampening or otherwise controlling the movements of elements of equipment and machinery.

BACKGROUND ART

Agricultural and construction equipment and machinery is often used in situations where the personal safety of operators and others within the vicinity of the machinery is of primary importance.

Many types of machinery such as that used for drilling, digging, cutting and the like a tool is suspended from a boom arm or other form of support.

Rotatable auger devices or example are generally suspended from booms and engineered so that the auger can be set up to drill vertical holes in required positions despite the fact that the surrounding terrain may mean that the vehicle to which the device is attached is not on a level surface.

To accommodate various types of terrains and conditions the augers are normally suspended so that they are able to freely swing on intersecting planes.

When drilling is not taking place and the vehicle or boom arm is being moved, the augers can pendulate in a largely uncontrolled manner creating a particularly dangerous potential impact situation for the operator and persons or property nearby.

Drilling augers are not the only types of equipment where tools are able to pendulate in a dangerous manner, other examples being pile drivers, mowing, cutting and digging equipment.

It is an object of the present invention to provide a support structure for a tool where pendulation of the tool with respect to a supporting device is controlled and/or inhibited.

Further objects and advantages of the present invention will become apparent from the ensuing description which is given by way of example.

DISCLOSURE OF INVENTION

According to the present invention there is provided a support structure for a tool said support structure comprising support means, a pivoted link supporting said tool from the support means and dampening means which controls pivoting of the tool with respect to the support means.

The dampening means may be a hydraulic or pneumatic cylinder.

The dampening means may be supplemented by other means, such as mechanical restraint.

The dampening means may be a ram having a cylinder chamber, a piston within the cylinder chamber, and a by-pass conduit providing communication to the interiors of the cylinder chamber on both sides of a piston within the chamber, and control means interposed in the by-pass conduit said control means being adjustable to control the interchange of fluids to and from the interiors of the cylinder.

According to a further aspect of the present invention the control means may be a valve having a valve stem within a valve passage said stem being adjustable to control the passage of fluids throughout the valve passage.

According to a further aspect of the present invention there is provided a support structure for a tool said support apparatus comprising a boom, a first pivoted link supporting the tool from the boom and enabling it to swing in a first plane and a second plane at right angles to the first plane dampening means controlling the pivoting of the tool relative to the boom.

It should be appreciated that the present invention provides a dampening apparatus which is adjustable to control the movements of many different forms of suspended tool whilst they are in an active or inactive state.

BRIEF DESCRIPTION OF THE DRAWINGS

Aspects of the present invention will now be described with reference to the accompanying drawings in which;

FIGS. 1 and 2 are side and plan views of one form of apparatus according to the present invention, and FIGS. 3 and 4 are side and plan views of a dampening cylinder according to a further aspect of the present invention, and FIGS. 5, 6 and 7 are circuit diagrams showing possible variations in hydraulic control circuits for apparatus of the present invention.

With respect to FIGS. 1 to 4 of the drawings, one form of apparatus according to the present invention may comprise a frame 1 which can be mounted on a boom arm or other form of vehicle mounted support (not shown), an elbow 2 pivoted mounted to the frame 1.

The elbow 2 can pivotably supports a tool generally indicated by arrow 3.

The arrangement illustrated is such that the tool 3 is able to pivot with respect to the frame 1 in a first axis X:X and also with respect to the elbow on a second intersecting axis Y:Y which is at ninety degrees to the first axis X:X.

The frame 1 is provided with two spaced lugs 4 and corresponding lugs 5 of the elbow 2 are pivotably connected to the lugs 4 on axis X:X by pins 6.

A mechanical stop indicated by arrow 7 can be fixed to one or both sides of the elbow 2.

The stop 7 can be arranged to bear against the frame 1.

The stop 7 can be fixed to a plate 8 and may comprise a screw threaded manually adjustable shaft 9 and a extension 10 which can be arranged to bear against the frame 1 to control pivoting of the elbow 2 and tool 3, or to be wound back to allow free pivoting of the elbow and tool.

The mechanical dampener illustrated can be replaced by hydraulic side dampening systems later illustrated and described herein in relation to FIG. 6.

The elbow 2 can include two spaced plates 11 and is pivotably connected to the plates via pivot pins 12 and lugs 13. This is typical of existing arrangements on existing "non-dampened" apparatus.

By extending the lugs 13 the lugs can be pivotably engaged with a hydraulic or pneumatic dampening or control cylinder generally by arrow 14.

The cylinder 14 can be pivotably engaged with the plates 11 of the elbow in such a manner that pendulation of the tool on pivot axis Y:Y can be dampened or controlled by the cylinder 14.

The cylinder 14 can comprise a tubular casing 15 attached to a collar 16 from which axles 17 pivotably engaged with plates 11 extend.

The cylinder 14 has an internal piston 18 and a piston rod 19 extends from both ends of the casing.

One end of the rod a forked attachment 29.

The forked rod 19 can be pivotably connected to an extension 21 of the lugs 13.

As the tool 3 pendulates on pins 12 the piston rod 19 reciprocates and the cylinder will tilt.

In the embodiment illustrated the lower sides of the plates 11 are provided with recesses 22 and pins 23 which extend from the tool 3 and are constrained within the recesses to prevent excessive pendulation of the tool.

Fluid connections can be made to the interiors of the cylinder 14 for the purpose of dampening or controlling pivoting movement of the tool. FIGS. 5, 6 and 7 of the drawings illustrate possible means of hydraulic control to the interiors of cylinders.

FIG. 5 of the drawings illustrates a dampening system for pendulum mounted boring/piling units.

The function of this dampening system is to allow oil to bleed through a pre-set adjustable orifice between the two sides of the cylinder.

The cylinder is a double rod type cylinder to keep an equal oil volume on both sides of the piston.

The unit is also fitted with the indicated cross-line relief valves to allow the cylinder to move freely if it is put under excessive load from improper use.

FIG. 6 of the drawings illustrates a system designed to be used as a side dampening system for pendulum mounted boring/piling units.

The function of this dampening system is to allow oil to bleed through a pre-set adjustable orifice between the two equal size dampening cylinders.

The unit is also fitted with cross-line relief valves to allow the cylinders to move freely they are put under excessive load from improper use. This unit can be used as an alternative or supplement to the mechanical side dampening unit described previously in relation to FIGS. 1 and 2.

FIG. 7 of the drawings illustrates a system which provides an ability to control the position of their drive unit. The system provides the operator the ability to drive (energize coil 'A' or 'B') and hold an auger/pile at the required angle until it has sufficient depth in the ground to hold it self.

The float system can be activated by energizing coil "C", this will allow the angle between the machines boom and the drive unit to change as the auger/pile enters the ground.

The float works by supplying a pilot signal to open the over centre valves and allow oil to escape from the cylinder.

The oil is able to bleed between the cylinder ports through a pre-set adjustable orifice.

This bleed line is also connected via the float valve to the system return line so that the cylinder can float in and out, with the oil displaced by the cylinder rod being able to come and go through to the return line.

The bleed line is also fitted with cross-line relief valves to allow the cylinder to move freely if it is put under excessive load from improper use, and to limit the amount of weight that the unit can lift in the powered mode.

It will be appreciated by those skilled in the art that the dampening cylinders of the present invention can be readily adapted to be driven in situations where this may be required.

One of the major advantages of the present invention is that the dampening system can be incorporated into new units or retro-fitted to existing units without major alterations being required.

Aspects of the present invention have been described by way of example only and it will be appreciated that modifications and additions thereto may be made without departing from the scope thereof.

What is claimed is:

1. A support structure for a tool comprising a boom or arm for supporting the tool, a first pivoted link supporting the tool from the boom, and enabling it to swing in a first plane, a second pivoted link on a second plane at right angles to the first plane, wherein at least one of said pivoted links includes a pendulum pivot supporting the tool with respect to the boom or arm in a manner which allows the tool to pendulate, and a self monitoring and operating dampening means for controlling the pendulation of the tool on the pendulum pivot with respect to the boom or arm, wherein the dampening means includes a ram having a cylinder chamber, a piston within the cylinder chamber associated with a piston rod, a by-pass providing communication to the interiors of the cylinder chamber on both sides of the piston within the chamber, and control means associated with the by-pass, and control means being adjustable to control the interchange of fluids to and from the interiors of the cylinder to maintain substantially equal pressure on each side of the piston.

2. A support structure as claimed in claim 1, wherein the piston is located substantially centrally on the piston rod to define two chambers of approximately equal volume.

3. A structure as claimed in claim 1, wherein the dampening means is supplemented by a mechanical restraint.

4. A structure as claimed in claim 1, wherein said control means is a valve having a valve stem within a valve passage, said stem being adjustable to control the passage of fluids throughout the valve passage.

5. A structure as claimed in claim 1, wherein the first pivoted link is provided by a frame having two spaced lugs joined by a cross member, the lugs being pivotably connected to a pair of spaced plates which provide a second pivotal link with the tool, said second pivotal link comprising a frame extending from the tool which is pivotably connected to said pair of spaced plates, said dampening means being pivotably connected to the spaced plates and the frame.

6. A support structure as claimed in claim 5, wherein the dampening means pivotably connected to the spaced plates is a hydraulic cylinder.

7. A support structure as claimed in claim 1, wherein a stop or stops are provided to constrain pendulation of the tool on the first plane and said dampening means controls pendulation of the tool on the second plane.

* * * * *